March 8, 1938. W. FRASER 2,110,722
HYDRAULIC TORQUE TRANSMITTING MECHANISM
Filed April 3, 1936 3 Sheets-Sheet 1
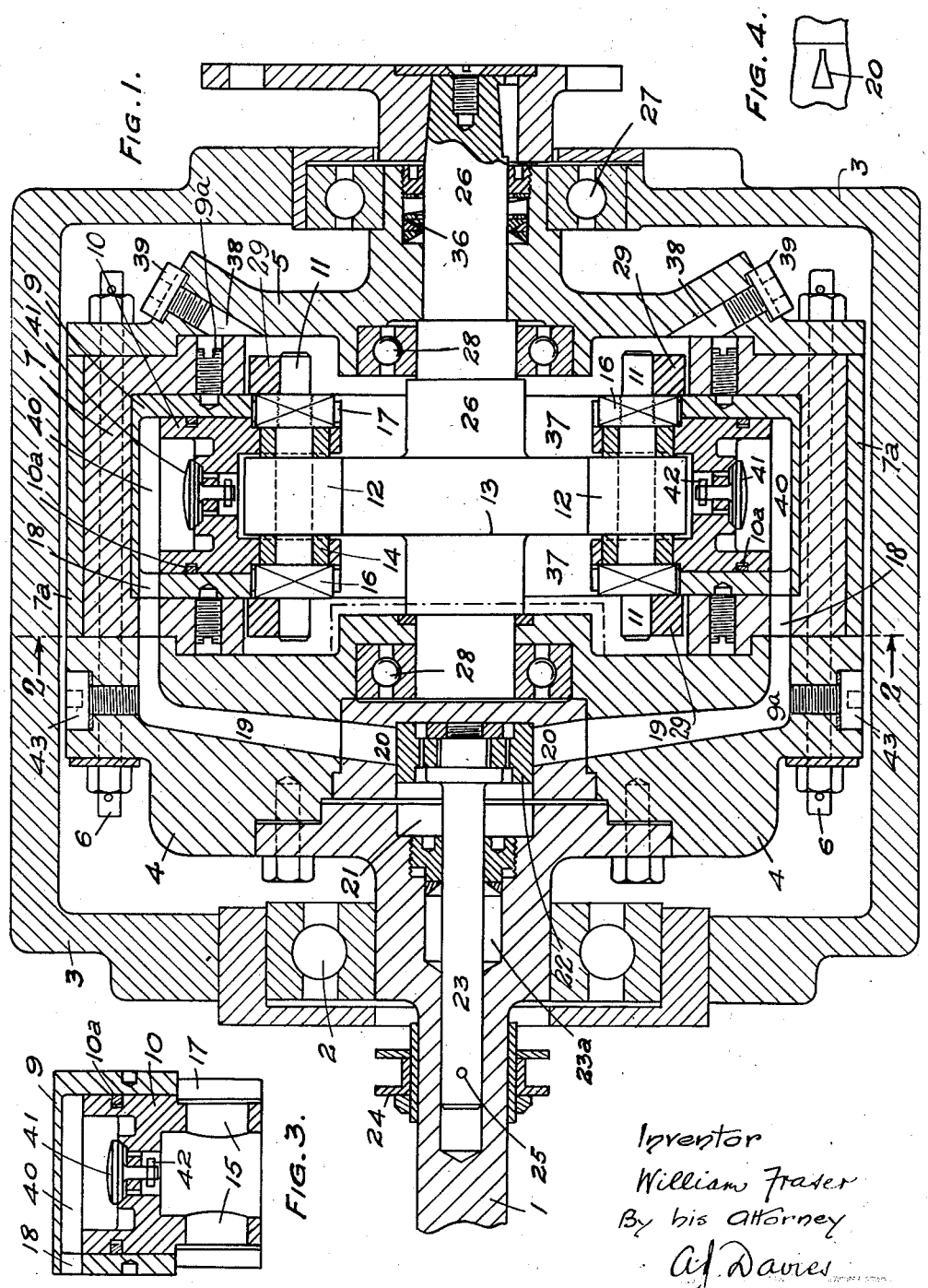

March 8, 1938. W. FRASER 2,110,722
HYDRAULIC TORQUE TRANSMITTING MECHANISM
Filed April 3, 1936 3 Sheets-Sheet 2
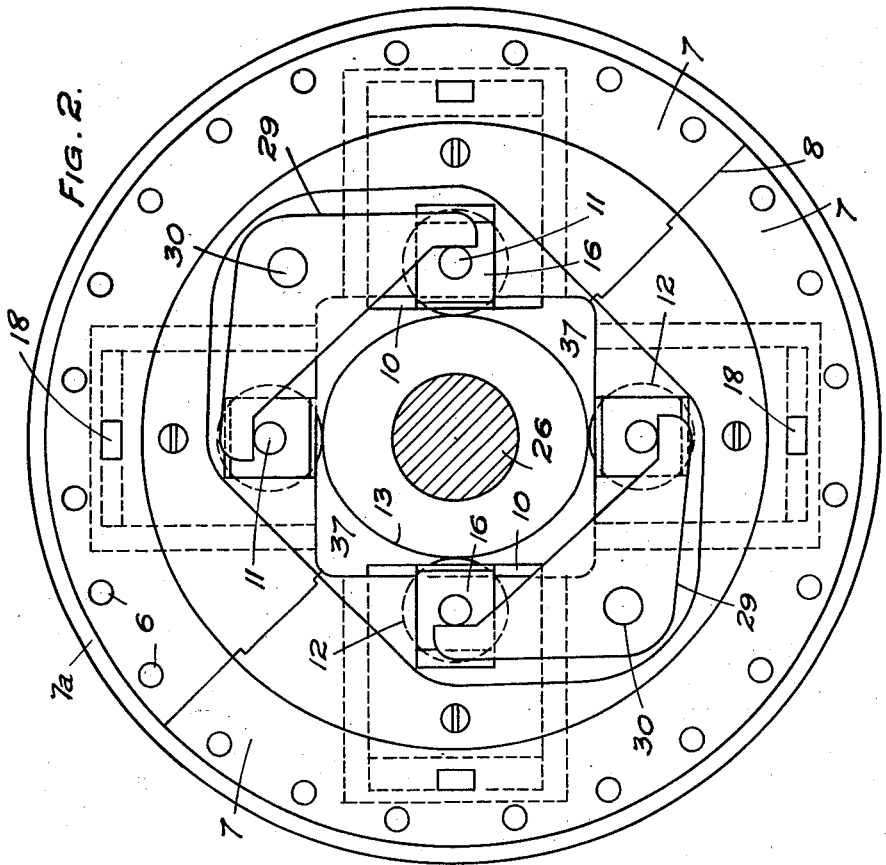
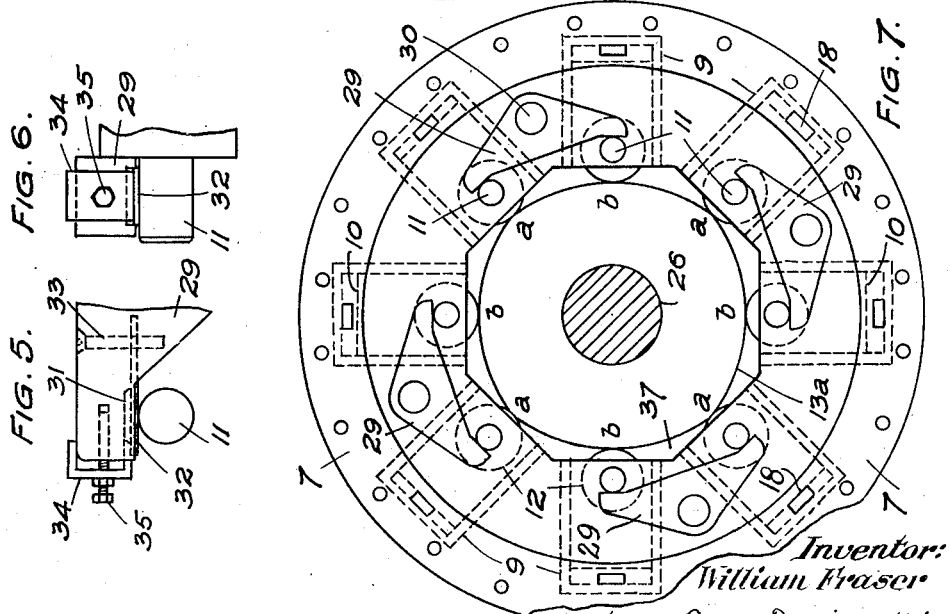
Inventor:
William Fraser
by A. J. Davies Atty.

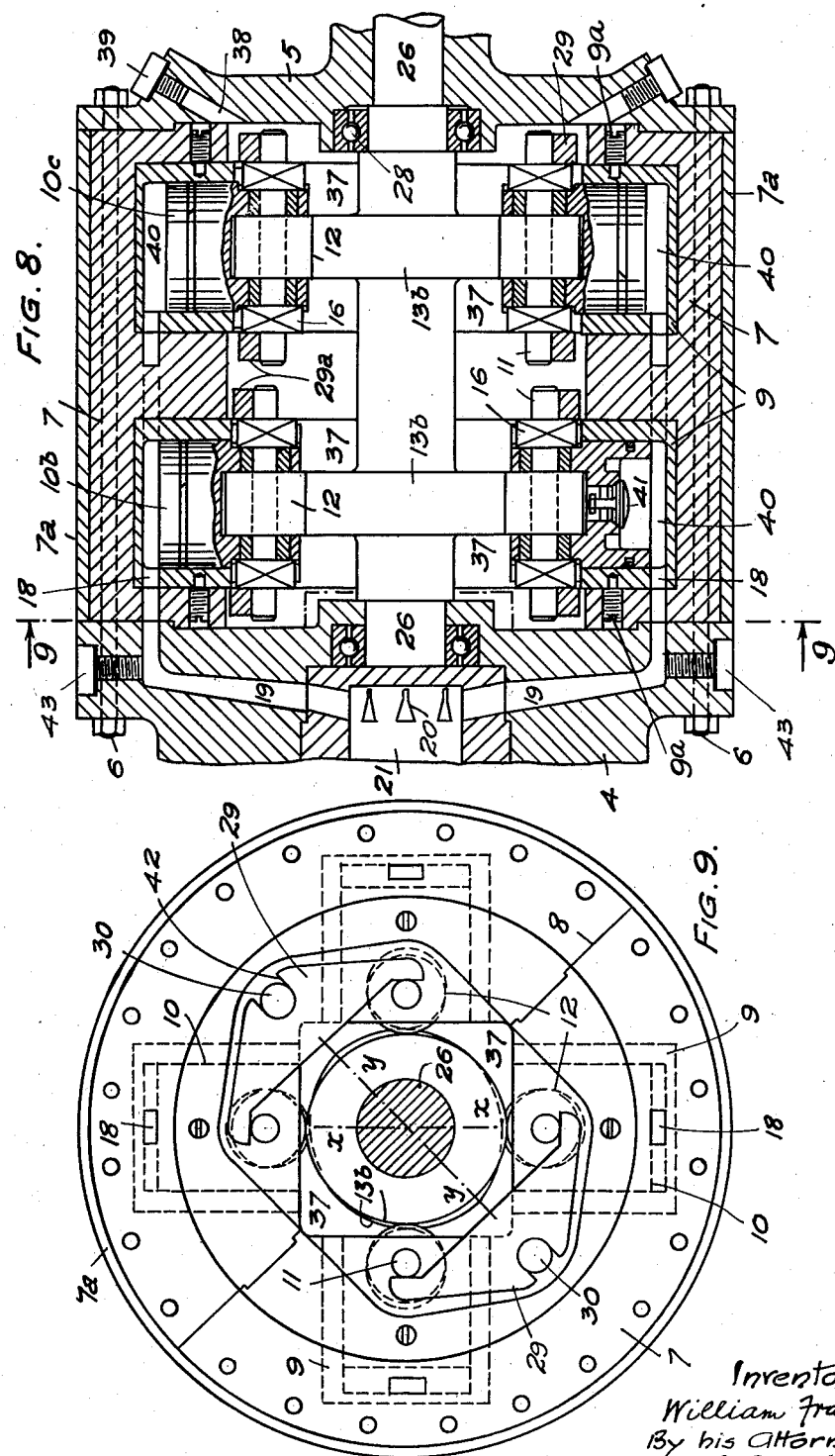

Patented Mar. 8, 1938

2,110,722

UNITED STATES PATENT OFFICE 2,110,722

HYDRAULIC TORQUE TRANSMITTING MECHANISM

William Fraser, Liverpool, England

Application April 3, 1936, Serial No. 72,515
In Great Britain April 17, 1935

5 Claims. (Cl. 192—60)

This invention relates to hydraulic torque transmitting mechanism or hydraulic couplings of the type in which power is transmitted from a driving to a driven shaft through the agency of a series of pistons in inter-communicating cylinders rotated by one shaft the pistons engaging a cam track carried from the other shaft, whereby reciprocal motion is imparted to the pistons when relative rotation of the shafts takes place, a pulsating flow of fluid, generally oil, being thus set up from certain of the cylinders to others which flow is controlled by a valve to effect any desired impedance of the flow and consequent variation in the hydraulic coupling effect between the driving and driven shafts. The disadvantage of such couplings, as previously proposed, lies in the fact that as great pressure is set up on the oil by the action of the pistons considerable leakage occurred, difficulty being experienced in making a fluid tight joint between the shafts and the casing in which they rotate, necessitating elaborate packing systems which were nevertheless unsuccessful. Further, previous couplings have required separate pumps for making good the leakage of oil from the coupling. Also, as a certain amount of air becomes incorporated with the oil in such couplings during working, and as such a mixture of air and oil is compressible the coupling grip is inefficient and the compression of the mixture, by raising the temperature of the air content, results in overheating of the mixture, further aggravating the tendency to leakage. The object of the present invention is to provide a type of coupling which shall avoid these disadvantages.

According to this invention the coupling comprises an oil containing casing rotated by the driving shaft and in which are the cylinders and associated pistons the latter engaging a cam or cams on the driven shaft journalled in the casing, the casing having an outer working or oil compression zone and a separate inner reservoir zone containing the cam or cams, the centrifugal effect in the mass of oil in the rotating coupling being utilized to cause oil to pass automatically, when necessary, from the inner reservoir zone to the outer working or compression zone of the apparatus, to compensate for leakage in the latter, thus eliminating any necessity for a separate pump for this purpose, and again, due to such centrifugal action reducing the pressure in the central part of the reservoir zone round the driven shaft, any leakage from such zone where the driven shaft enters therein is minimized. Preferably the compensating supply of oil from the central reservoir to the outer working zone passes by way of valves in the pistons which, while closed on the compression stroke, may open on the inward stroke of the pistons, permitting oil to pass under centrifugal action from the reservoir to the working zone. The cylinders and pistons are preferably of even number disposed radially to the aligned axes of the driving and driven shafts, and the cam or cams is or are of symmetrical contour so designed that each two diametrically opposite pistons forming a pair mutually approach or recede simultaneously moving in opposite directions inwardly and outwardly in their cylinders, such opposed reciprocation resulting in a mutual balancing movement of all the pistons as the casing rotates. Rollers on the pistons ride in contact with the cam and in order to counteract centrifugal action on the pistons and maintain them in close contact with the cam, adjacent pistons are interconnected in pairs by levers, in such manner that as one piston is moved radially outward by the cam the other is constrained to move inwardly and maintain contact with the cam. The ends of such levers may be fitted with resilient contacts. Further features of the invention relate to modifications of the apparatus, embodying several cams on the driven shaft associated with several series of pistons and cylinders on the driving shaft.

Several embodiments of the invention are illustrated in the accompanying drawings.

Fig. 1 is a longitudinal section of one form of coupling having four pistons and cylinders arranged in opposed pairs and a single oval cam, Fig. 2 being a cross section on the line 2—2 of Fig. 1 looking in the direction of the arrows.

Fig. 3 is a detail section of a piston in its cylinder lining and

Fig. 4 is a fragmentary detail showing the terminal shape of the ports leading into the control valve cavity.

Fig. 5 is a fragmentary side view and

Fig. 6 a corresponding end view of the resilient contact on the bell crank levers.

Fig. 7 is a diagrammatic view showing a modified arrangement of coupling having eight cylinders, their pistons engaging a single multi-peaked cam.

Fig. 8 is a longitudinal section of a further modification in which the driven shaft carries two separate oval cams relatively staggered, and Fig. 9 is a cross section on the line 9—9, Fig. 8, looking in the direction of the arrows.

Referring in the first instance to the form shown in Figs. 1 to 6 inclusive, the engine or driving shaft 1 carries an oil containing casing made up of end plates 4, 5 bolted at 6 to a block 7 within which the cylinders are formed. This block is preferably made in sections, say halves, joined at 8, Fig. 2, for facility in boring the cylinders from the inside to leave the cylinder heads solid. The halves of the cylinder block are shrouded by a ring 7a. The cylinders are fitted with liners 9 secured by pins 9a housing pistons 10, pins 11 pivotally carrying rollers 12 riding in contact with the symmetrical oval cam 13 on the driven shaft 26 journalled in the casing. The pins 11 are bushed at 14 in apertures 15, Fig. 3, in the pistons and carry cod pieces 16 slidable in grooves 17 in the liners 9. These cod pieces meet the side thrust on the rollers 12 set up by the action of the cam. Ports 18 in the liners and ducts 19 by which only the cylinders may intercommunicate lead to tapered ports 20, Fig. 4, in a central valve cavity 21 in the casing common to all the parts and remote from the bearing of the driven shaft rotating in such casing, which cavity is provided with a piston valve 22 on a stem 23 housed in the driving shaft and moved by a fork engaging a collar 24 connected to the stem by a pin 25 passing through a slot, not shown, in the driving shaft 1. The driving shaft and casing are revolubly mounted in ball bearings 2 and 27 in a stationary housing 3, and the driven shaft 26 is journalled in other bearings 28 in the casing, and is packed at 36 where it enters the casing with a series of sealing rings. The shaft 26 carries a cam 13 which in the form illustrated, Fig. 2, is oval having a major and a minor axis. The relative movement of adjacent pistons is intercontrolled by means of bell crank levers 29 pivoted at 30 on the casing, the lever arms engaging the ends of the pins 11. By this means the outwardly moving pistons riding up the cam peaks constrain the adjacent pistons to move inward and follow the contour of the cam, diametrically opposed pistons mutually approaching or receding in rotational balance. The ends of the levers 29 where they engage the pins are fitted with resilient contacts. This is effected by forming a recess 31 at the end of each arm covered by a flat spring 32 held in place by a screw 33, the spring 32 contacting with the pin 11. The springs afford sufficient resilience to permit the path of the pin to accommodate itself to the cam contour independently of that of the pivot 30. Such springs must however be sufficiently rigid as not to deflect under centrifugal action of the pistons, and in order that their resilience may be adjusted, the effective length of the rear recess 31 may be varied by means of a yoke 34, one limb of which, Fig. 5, passes beneath the spring and forms the outer boundary of the recess, an adjusting screw 35 moving the yoke in or out to alter the length of the recess and the effective resilience of the spring.

In the modification shown in Fig. 7 instead of a simple oval or two peak cam, the symmetrical cam 13a has four peaks a and four intervening depressions b, and there are four corresponding pairs of pistons so that in this arrangement also the diametrically opposed pistons forming a pair approach and recede simultaneously, the reciprocating masses being again in rotational balance, adjacent pistons being also positively controlled by the bell crank levers 29 pivoted at 30.

In the arrangement shown in Figs. 8 and 9, the driven shaft 26 carries two axially spaced symmetrical oval cams 13b of the single major and minor axis type shown in Fig. 2, but as will be seen from Fig. 9, the major axes $x-x$, $y-y$ of the cams are relatively staggered, and two separate series of pistons 10b, 10c with their corresponding cylinders are provided in the casing. In this arrangement in order that the inner bell cranks 29a between the two sets of pistons may be easily positioned, they are slotted at 42 to engage the pivots 30.

It will be seen that each form of apparatus comprises two separate zones, a central reservoir zone 37 containing the cam into which oil may be fed from the apertures 38 in the casing enclosed by the plugs 39, and a working zone 40 exterior of the pistons and subject to their compression action, the zones being enclosed and separated by the pistons 10. Each piston is provided with a non-return valve 41 opening on the inward or suction stroke of the piston when leakage occurs in the working zone and permitting oil to pass thereto from the reservoir 37. Such valves are preferably of the mushroom type, Figs. 1 and 3, offering a large area subject to pressure but may be ball valves and, if desired, spring controlled, and their lift is limited by nuts or collars 42. The working zone of the apparatus may be filled initially by way of apertures closed by the plugs 43.

Owing to the reservoir 37 being isolated from the pressures in the working zone 40 and the outward swirl of oil in the reservoir away from the shaft 26 due to centrifugal action, leakage from the reservoir along the shaft 26 is almost completely prevented. The only leakage possible from the working zone 40 is past the pistons into the reservoir or the minute leakage past the piston valve 22 by way of its stem 23, and as the valve and its stem do not rotate relatively to the casing, any such leakage may be more effectively resisted by packing in the stuffing box 23a.

The device operates as follows: The reservoir 37 being filled with oil and the driving shaft rotating, the centrifugal action of the oil in the reservoir lifts the valves 41 and automatically fills the working zone 40, the air therefrom being expelled. Supposing the control valve 22 to be retracted and the ports 20 open, the rollers 12 revolve idly round the cam, reciprocating the pistons and expelling the oil from certain of the cylinders by way of the ducts 19 and cavity 21 to the other cylinders, but by moving the valve 22 controlling intercommunication between the cylinders, the ports 20 may be restricted as required to vary the impedance in the oil flow and so gradually achieve a hydraulic coupling effect between the shafts 1 and 26, a greater or less amount of tractive pressure obtaining between the rollers 12 and the cam 13, until ultimately, if the ports 20 be entirely closed the flow will be completely arrested, the pistons locked on the cam and the driving and driven shafts rotate together.

It is necessary in such couplings that a full quantum of oil be maintained in the working or compression zone and leakage therefrom made good. This is effected in the present invention on the inward movement of the piston, as should there not be a full quantum of oil behind such piston, then owing to the loss of pressure in the cylinder, the constraining inward movement on the piston exercised by the lever 29, and the centrifugal outward pressure in the reservoir beneath the valve 41, it will open and pass oil to the cylinder above, and in this way any leakage in the working zone is automatically being made good while the driving shaft is rotating, the valve however closing again on its seating directly the piston moves outward on the compression stroke.

In order to take advantage of the centrifugal action of the oil for the purposes described, the device is only suitable to work with the cylinders rotated from the driving shaft and in this respect the invention is distinguished from other types of hydraulic couplings in which the cylinders might be rotated from either the driving or driven shafts.

A further advantage arising from the centrifugal action of the oil lies in the fact that should there be any air mixed with the oil in the working zone, which mixture owing to its resilience under compression would result in an inefficient hydraulic grip, the oil, being heavier than the air content, will tend to accumulate in the working space displacing the air content therefrom, past the pistons into the central reservoir 37.

Again owing to there being two entirely separate zones for the oil namely, a working or pressure zone comprising the cylinders, communicating ducts and valve cavity, and a reservoir or non-pressure zone comprising the central space containing the cam and a portion of the driven shaft, the bearing of this driven shaft in the casing is not open to any working pressure or liable to leakage as previously mentioned, and by utilizing the centrifugal action of the reservoir oil to open the valves 41 and replenish the working zone as any loss develops therein, a much longer period of efficiency is ensured in the apparatus before any necessity arises for the user to introduce a fresh supply of oil into the reservoir. The profile contour of the cam should be accurately designed to ensure that the volume swept from the cylinders at any period during the outward piston movement is exactly equal to that evacuated by the inward piston movement, so that as the rollers are kept continuously in close riding contact with the cam by the bell crank levers, a pulsation of oil from one set of cylinders to the others is maintained. If desired, the cylinder liners may be eliminated and the cylinders formed directly in the cylinder block, the cod pieces then working in grooves formed in the walls of the cylinder.

Owing to the centrifugal action on the oil in the central non-pressure zone, a separation of any air content will also tend to take place from the oil therein, the heavier oil lying on the exterior of the reservoir zone and only purer oil free from any air content thus entering the working zone by way of the valves and so ensuring only oil free from air being maintained in such working zone.

In previous couplings the oil was expelled from the cylinders into the main mass of oil in the coupling, and such action produced a turbulence of any air content with the oil, so maintaining the air and oil continually in mixture, whereas by providing two separate zones such turbulence is avoided, the oil and any air tending to remain separate.

I claim:—

1. A hydraulic coupling comprising a driving shaft, an oil containing casing rotated by said shaft, an even number of cylinders and associated pistons radially disposed in the casing, non-return valves on the pistons, ducts forming the sole communication between the outer ends of the cylinders, said cylinders and ducts forming an outer oil compression zone through which ducts only the oil pulsates between the cylinders, a valve controlling the ducts, a driven shaft journalled in the casing, a cam of symmetrical contour on the driven shaft engaging and reciprocating the pistons, each two pistons forming a diametrically opposed pair mutually approaching or receding simultaneously in rotary balance, said driven shaft and cam being located in an inner reservoir in the casing separated from the pulsating oil flow.

2. A hydraulic coupling comprising, a driving shaft, an oil containing casing rotated by said shaft, a series of cylinders and associated pistons in the casing, rollers on the pistons, slidable thrust resisting cod pieces on the pistons, ducts by which the cylinders may intercommunicate, said cylinders and ducts forming an outer oil compression zone in the casing, a valve controlling the ducts, a driven shaft in the casing, a cam on the driven shaft engaged by the rollers and reciprocating the pistons, said driven shaft and cam being located in an inner reservoir zone in the casing, the inner and outer zones being enclosed and separated from each other by the pistons.

3. A hydraulic coupling comprising, a driving shaft, an oil containing casing rotated by said shaft, an even number of cylinders and associated pistons radially disposed in the casing, rollers pivotally carried on pins in the pistons, ducts by which the cylinders may intercommunicate, said cylinders and ducts forming an outer oil compression zone in the casing, a valve controlling the ducts, a driven shaft in the casing, a cam of symmetrical contour on the driven shaft engaging the rollers and reciprocating the pistons, levers inter-controlling the relative reciprocation of the two pistons forming each adjacent pair, resilient contacts on said levers engaging the roller pivotal pins, said driven shaft and cam being located in an inner reservoir zone in the casing, the inner and outer zones being enclosed and separated from each other by the pistons.

4. A hydraulic coupling comprising, a driving shaft, an oil containing casing rotated by said shaft, an even number of cylinders and associated pistons radially disposed in the casing, rollers pivotally carried on pins in the pistons, ducts by which the cylinders may intercommunicate, said cylinders and ducts forming an outer oil compression zone in the casing, a valve controlling the ducts, a driven shaft in the casing, a cam of symmetrical contour on the driven shaft engaging the rollers and reciprocating the pistons, levers inter-controlling the relative reciprocation of the two pistons forming each adjacent pair, springs on the levers engaging the roller pivotal pins, recesses in the levers behind the springs, means for adjusting the lengths of the recesses, said driven shaft and cam being located in an inner reservoir zone in the casing, the inner and outer zones being enclosed and separated from each other by the pistons.

5. A hydraulic coupling comprising a driving shaft, an oil containing casing rotated by said shaft, several axially spaced series of cylinders each comprising an even number of cylinders radially disposed in the casing and pistons associated therewith, ducts forming the sole communication between the outer ends of the cylinders, said cylinders and ducts forming an outer oil compression zone through which ducts only the oil pulsates between the cylinders, a valve controlling the ducts, a driven shaft journalled in the casing, cams relatively staggered on the driven shaft corresponding in number with the series of cylinders, each cam reciprocating one series of pistons, each two pistons forming a diametrically opposed pair in any series mutually approaching or receding in balance, said driven shaft and cams being located in an inner reservoir in the casing separated from the pulsating oil flow.

WILLIAM FRASER.